Patented Sept. 9, 1941

2,255,074

UNITED STATES PATENT OFFICE 2,255,074

STEROL DERIVATIVES AND PROCESS OF FORMING SAME

Russell Earl Marker, State College, Pa., assignor to Parke, Davis & Company, Detroit, Mich., a corporation of Michigan No Drawing. Original application April 13, 1936, Serial No. 74,223. Divided and this application July 10, 1939, Serial No. 283,687

14 Claims. (Cl. 260—397.1)

The invention relates to new sterol derivatives and in particular to new derivatives of cholesterol and methods for their preparation.

Compounds of the sterol type having a cyclopentano phenanthrene framework of four condensed ring systems, are known to include many physiologically important compounds, including sex hormones, vitamins, etc. Derivatives of cholesterol have received particular attention because cholesterol is a comparatively abundant raw material found in nature. However, an isomer of cholesterol, namely, epi-cholesterol, has not yet been prepared, in spite of many attempts in that direction.

This application is a division of my copending application, Serial No. 74,223, filed April 13, 1936. Said application contains claims to the compound, epi-cholesterol, as well as processes for the preparation of compounds of this type.

The present application is directed to the preparation of certain other derivatives of cholesterol and epi-cholesterol, more particularly the 3-carboxy derivatives.

The process of the present invention is preferably carried out by converting a sterol halide possessing asymmetry at the carbon atom to which the halogen is attached, (i. e. at the halide carbon atom), into its Grignard compound by reaction with magnesium. The Grignard compound is then reacted with carbon dioxide, and the complex thus obtained is decomposed to eliminate magnesium and obtain 3-carboxy-$\Delta^5$-cholestene.

The invention will be more readily comprehended by referring to the following examples given merely by way of illustration without intending to limit the invention in any way to the mere details and materials disclosed in these examples.

EXAMPLE 1.—*3-Carboxy-$\Delta^5$-cholestene from cholesteryl chloride*

A Grignard reagent prepared from 0.3 mole of cholesteryl chloride is cooled to 0° and dry carbon dioxide passed over the surface of the solution for 5 hours with vigorous stirring under a pressure of 40 mm. of mercury. The Grignard complex is decomposed by pouring into 300 cc. of ice-cold 10% sulfuric acid with shaking. The layers are separated and the ethereal solution filtered, removing most of the ether insoluble cholesteryl acid. The residue is washed with ether and then extracted in a Soxhlet extractor. 3-carboxy-$\Delta^5$-cholestene is then crystallized from benzene, m. 222–225°.

The acid adds bromine readily. The sodium salt is extremely insoluble in water. The free acid is very insoluble in ether, but may be crystalized from benzene. The same acid is prepared from cholesteryl magnesium bromide.

Analysis: Calc. for $C_{28}H_{46}O_2$, C, 81.1; H, 11.2. Found, C, 81.1; H, 11.4.

The 3-carboxy-$\Delta^5$-cholestene can, of course, be prepared by the same type of reactions as used above when starting with some other cholesteryl halide than the chloride. For example, cholesteryl bromide can be used in making the Grignard compound.

EXAMPLE 2.—*Methyl ester of 3-carboxy-$\Delta^5$-cholestene*

To a solution of 1.0 g. of the recrystallized unsaturated acid in 25 cc. of absolute methyl alcohol is added 4 drops of sulfuric acid. The product is refluxed for 40 hours. Water is then added and the product filtered. The residue is taken up in 25 cc. of ether, washed with 5% sodium hydroxide solution, and finally with water. The ether solution is filtered and the ether distilled off, leaving a solid residue. This is crystallized from a mixture of ether and methyl alcohol. Yield, 0.9 g.; m. 101.5–102.5°. The ester is readily soluble in ether.

Analysis: Calc. for $C_{29}H_{48}O_2$, C, 81.2; H, 11.3. Found C, 81.1; H, 11.3.

EXAMPLE 3.—*Ethyl ester of 3-carboxy-$\Delta^5$-cholestene*

A solution of 5 g. of recrystallized acid is refluxed 8 hours with 80 cc. of absolute ethyl alcohol and 20 drops of sulfuric acid. The reaction mixture is poured into 200 cc. of water and 100 cc. of ether added. The ether layer is washed with 5% sodium hydroxide solution, then with water. It is filtered and then the ether evaporated. The product is crystallized from a mixture of ether and ethyl alcohol. Yield 4.0 g.; m. 82.5–83.0°.

Analysis: Calc. for $C_{30}H_{50}O_2$, C, 81.4; H, 11.4. Found C, 81.4; H, 11.2.

Similar examples can be carried out using other alcohols than methanol and ethanol in order to get other esters 3-carboxy-$\Delta^5$-cholestene.

EXAMPLE 4.—*3-carboxy cholestane*

A solution of 2.8 g. of 3-carboxy-$\Delta^5$-cholestene in 500 cc. of dry ether and 5 cc. of glacial acetic acid is shaken with 500 mg. of platinum oxide under hydrogen at 45 pounds pressure for one hour. The catalyst is filtered off, the acetic acid washed out with three 50 cc. portions of water and the ether evaporated. The solid is crystallized from benzene, m. 209-211°. A mixture with the unsaturated acid gives a melting point depression of 11°.

Analysis: Calc. for $C_{28}H_{48}O_2$, C, 80.7; H, 11.6. Found C, 80.8; H, 11.8.

EXAMPLE 5.—*Methyl ester of 3-carboxy cholestane*

A solution of 25 cc. of absolute methyl alcohol containing 5 drops of sulfuric acid is added to one g. of 3-carboxy cholestane. This is refluxed for 20 hours. The mixture is then added to 50 cc. of water. To this is added 30 cc. of ether and the ethereal solution is washed with 5% sodium hydroxide solution and then with water. The ester is crystallized from ether-methyl alcohol. Yield 0.85 g., m. 70-71°.

Catalytic reduction of the methyl ester of 3-carboxy-$\Delta^5$-cholestene gives the same ester.

Analysis: Calc. for $C_{29}H_{50}O_2$, C, 80.9; H, 11.7. Found C, 80.8; H, 11.8.

EXAMPLE 6.—*Ethyl ester of 3-carboxy cholestane*

A solution of 1.0 g. of the ethyl ester of 3-carboxy-$\Delta^5$-cholestene in 100 cc. of ether with 2 cc. of acetic acid is reduced catalytically by shaking with platinum oxide under hydrogen at a pressure of 45 pounds. The catalyst is filtered, the ethereal solution washed with 5% sodium hydroxide solution, and then the ether evaporated. The residue is crystallized from a mixture of ether and ethyl alcohol. Yield 0.8 g., m. 66.5-67.5°.

Analysis: Calc. for $C_{30}H_{52}O_2$, C, 81.0; H, 11.8; Found C, 81.0; H, 11.7.

It will be readily apparent from the above description of the invention that valuable new compounds in the physiologically important field of sterols can now be prepared, which are not only directly useful but which can be used as starting points in the synthesis of other valuable compounds in this class.

Some of the subject matter disclosed but not claimed in this application is claimed in my co-pending application, Serial No. 194,013, filed March 4, 1938.

What I claim as my invention is:

1. Process for the preparation of 3-carboxy-$\Delta^5$-cholestene from a cholesteryl halide which comprises reacting the halide with magnesium to obtain a cholesteryl magnesium halide, combining the latter with carbon dioxide to produce a complex with the cholesteryl magnesium halide and decomposing said complex with water to obtain 3-carboxy-$\Delta^5$-cholestene.

2. Process for the preparation of 3-carboxy-$\Delta^5$-cholestene from cholesteryl chloride which comprises reacting the chloride with magnesium to obtain cholesteryl magnesium chloride, combining the latter with carbon dioxide to produce a complex with the cholesteryl magnesium chloride and decomposing said complex with water to obtain 3-carboxy-$\Delta^5$-cholestene.

3. Process for the preparation of 3-carboxy cholestane from a cholesteryl halide which comprises reacting the halide with magnesium to obtain a cholesteryl magnesium halide, combining the latter with carbon dioxide to produce a complex with the cholesteryl magnesium halide, decomposing said complex with water to obtain 3-carboxy-$\Delta^5$-cholestene, and reducing the 3-carboxy-$\Delta^5$-cholestene to obtain 3-carboxy cholestane.

4. Process for the preparation of 3-carboxy-cholestane from cholesteryl chloride which comprises reacting the chloride with magnesium to obtain cholesteryl magnesium chloride, combining the latter with carbon dioxide to produce a complex with the cholesteryl magnesium chloride, decomposing said complex with water to obtain 3-carboxy-$\Delta^5$-cholestene, and reducing the 3-carboxy-$\Delta^5$-cholestene to obtain 3-carboxy-cholestane.

5. Process for the preparation of an ester of 3-carboxy-$\Delta^5$-cholestene from a cholesteryl halide which comprises reacting the halide with magnesium to obtain a cholesteryl magnesium halide, combining the latter with carbon dioxide to produce a complex with the cholesteryl magnesium halide, decomposing said complex with water to obtain 3-carboxy-$\Delta^5$-cholestene, and esterifying the latter with an alcohol.

6. Process for the preparation of an ester of 3-carboxy-$\Delta^5$-cholestene from cholesteryl chloride which comprises reacting the chloride with magnesium to obtain cholesteryl magnesium chloride, combining the latter with carbon dioxide to produce a complex with the cholesteryl magnesium chloride, decomposing said complex with water to obtain 3-carboxy-$\Delta^5$-cholestene, and esterifying the latter with an alcohol.

7. Process for the preparation of an ester of 3-carboxy cholestane from a cholesteryl halide which comprises reacting the halide with magnesium to obtain a cholesteryl magnesium halide, combining the latter with carbon dioxide to produce a complex with the cholesteryl magnesium halide, decomposing said complex with water to obtain 3-carboxy-$\Delta^5$-cholestene, reducing the latter to obtain 3-carboxy cholestane, and esterifying the latter with an alcohol.

8. Process for the preparation of an ester of 3-carboxy cholestane from cholesteryl chloride which comprises reacting the chloride with magnesium to obtain cholesteryl magnesium chloride, combining the latter with a carbon dioxide to produce a complex with the cholesteryl magnesium halide, decomposing said complex with water to obtain 3-carboxy-$\Delta^5$-cholestene, reducing the latter to obtain 3-carboxy cholestane, and esterifying the latter with an alcohol.

9. 3-carboxy-$\Delta^5$-cholestene.

10. 3-carboxy-cholestane.

11. Methyl ester of 3-carboxy-$\Delta^5$-cholestene.

12. A compound of the class consisting of 3-carboxy-$\Delta^5$-cholestene, its lower alykyl esters, 3-carboxy-cholestane and its lower alkyl esters.

13. A lower alkyl ester of 3-carboxy-$\Delta^5$-cholestene.

14. In a process for the preparation of a new class of cholestane derivatives, the step which consists in esterifying a member of the group 3-carboxy-cholestane and 3-carboxy-$\Delta^5$-cholestene with an alcohol.

RUSSELL EARL MARKER.